(12) United States Patent
Parler, Jr. et al.

(10) Patent No.: US 7,274,551 B1
(45) Date of Patent: Sep. 25, 2007

(54) HERMETICALLY SEALED ELECTROLYTIC CAPACITOR

(75) Inventors: Samuel G. Parler, Jr., Clemson, SC (US); Philip A. Knight, Greer, SC (US)

(73) Assignee: Cornell-Dubilier Marketing, Inc., Liberty, SC (US)

( * ) Notice: Subject to any disclaimer, the term of this patent is extended or adjusted under 35 U.S.C. 154(b) by 0 days.

(21) Appl. No.: 11/588,131

(22) Filed: Oct. 26, 2006

(51) Int. Cl.
*H01G 9/10* (2006.01)

(52) U.S. Cl. ...................... 361/518; 361/519

(58) Field of Classification Search ......... 361/517–521
See application file for complete search history.

(56) References Cited

U.S. PATENT DOCUMENTS

| | | | |
|---|---|---|---|
| 3,243,668 A | 3/1966 | Diggens | 317/230 |
| 3,255,386 A | 6/1966 | Millard et al. | 317/230 |
| 3,273,028 A | 9/1966 | Sparkes | 317/230 |
| 3,275,901 A | 9/1966 | Merritt et al. | 317/230 |
| 3,275,902 A | 9/1966 | McHugh et al. | 317/230 |
| 3,289,051 A | 11/1966 | Sloan | 317/230 |
| 3,297,918 A | 1/1967 | Booe | 317/230 |
| 3,301,270 A | 1/1967 | Horn | 317/230 |
| 3,341,751 A | 9/1967 | Clement | 317/230 |
| 3,515,951 A | 6/1970 | Krasienko et al. | 317/230 |
| 3,611,054 A | 10/1971 | Piper et al. | 317/230 |
| 3,624,458 A | 11/1971 | Howell et al. | 317/230 |
| 3,624,460 A | 11/1971 | Correll | 317/230 |
| 3,646,405 A | 2/1972 | Wallis et al. | 317/230 |
| 3,684,927 A | 8/1972 | Correll | 317/230 |
| 3,697,823 A | 10/1972 | Correll | 317/230 |
| 3,906,311 A | 9/1975 | Shoot et al. | 317/230 |
| 3,993,938 A * | 11/1976 | Marien et al. | 361/518 |
| 4,025,827 A | 5/1977 | Pellerin et al. | 361/433 |
| 4,296,458 A | 10/1981 | Smith et al. | 361/433 |
| 4,352,714 A * | 10/1982 | Patterson et al. | 216/33 |
| 4,683,516 A | 7/1987 | Miller | 361/328 |
| 4,987,519 A | 1/1991 | Hutchine et al. | 361/518 |
| 4,992,910 A | 2/1991 | Evans | 361/502 |
| 5,777,840 A | 7/1998 | Oney | 361/519 |
| 6,064,563 A * | 5/2000 | Yamada et al. | 361/521 |
| 6,445,567 B1 * | 9/2002 | Komatsuki et al. | 361/518 |
| 6,952,339 B1 | 10/2005 | Knowles | 361/528 |
| 7,206,186 B1 * | 4/2007 | Knight et al. | 361/301.3 |

OTHER PUBLICATIONS

Macomber et al.; "Longlife, High-Voltage, Hermetically-Sealed Aluminum Electrolytic Capacitors"; 16th Capacitor and Resistor Technology Symposium; Mar. 11-15, 1996.

* cited by examiner

*Primary Examiner*—Eric Thomas

(57) ABSTRACT

A hermetically sealed, electrolytic capacitor is provided having a lid incorporating a liquid seal on the wet side of the lid and a hermetic seal on the dry side of the lid. The lid includes a plate, with a hole through its thickness, and a flange creating an orifice in the hole, adjacent the underside of the lid. A liquid seal is positioned in the orifice and has a terminal insulated from the plate by an elastomeric ring. The terminal is electrically connected to the capacitor element on its wet side, and the terminal is electrically connected to the hermetic seal on its dry side.

20 Claims, 3 Drawing Sheets

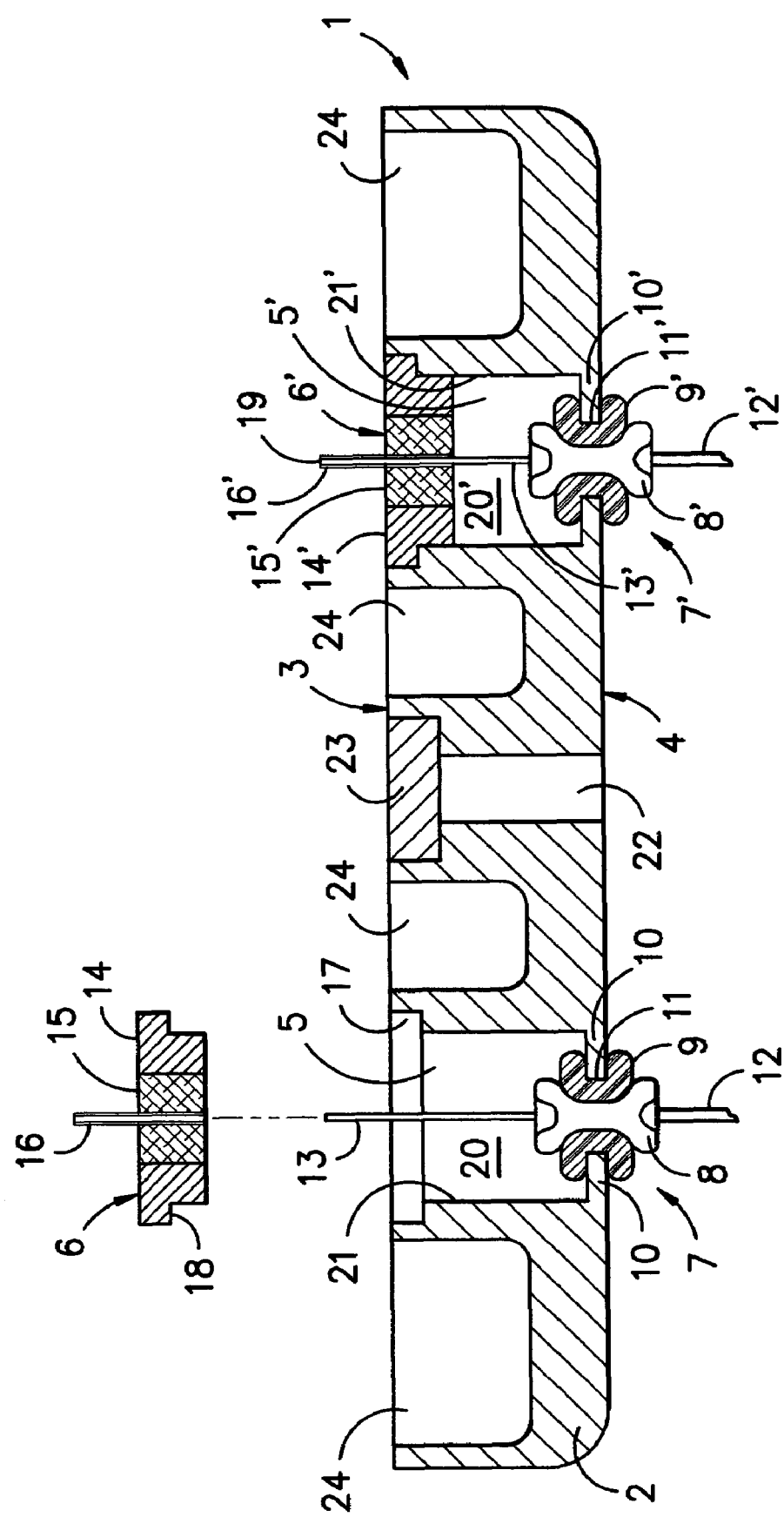
FIG. -1-

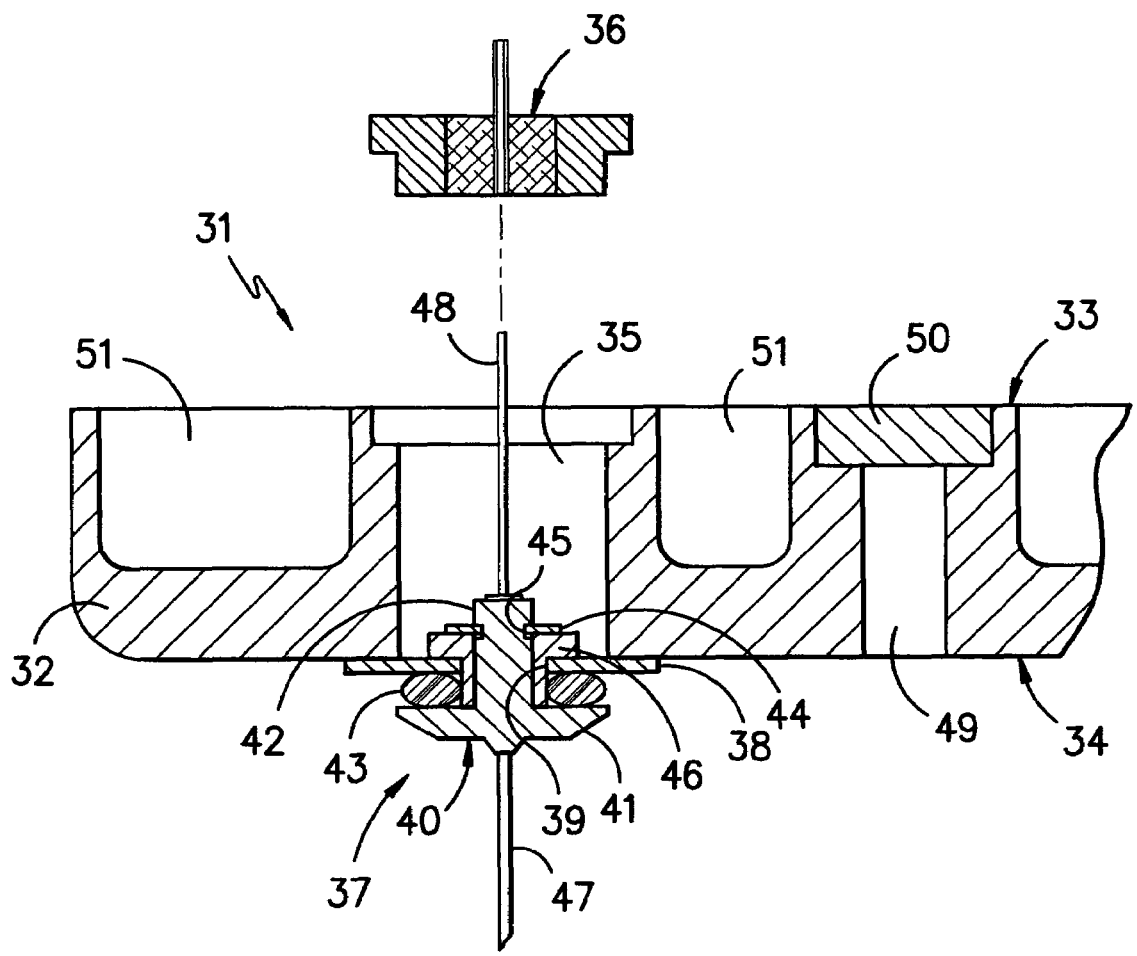
FIG. -2-

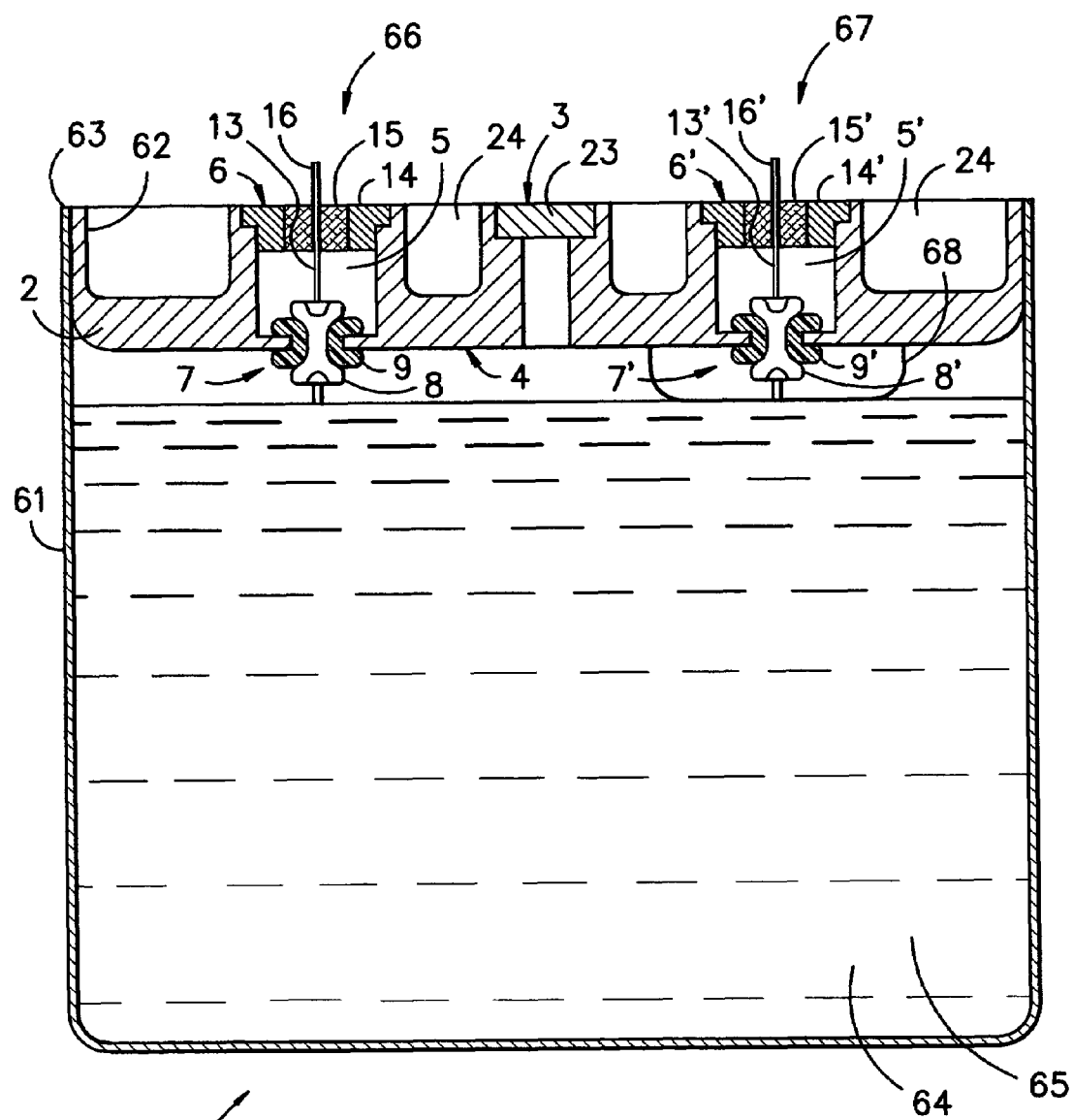
FIG. —3—

HERMETICALLY SEALED ELECTROLYTIC CAPACITOR

TECHNICAL FIELD

This invention relates generally to the field of electrolytic capacitors that are hermetically sealed, and in particular to a capacitor having a liquid-tight seal between the electrolyte solution and the terminal used to make an electrical connection between the capacitor and an external device.

BACKGROUND OF THE INVENTION

Capacitors containing an electrolyte solution are subject to failure caused by leakage of the electrolyte liquid or vapor. For example, it is common for gas, such as hydrogen, to be evolved during operation, causing pressure to build inside the capacitor. Consequently, leaks may occur around conventional non-hermetic polymeric seals, where the terminal, for example a wire, protrudes from the capacitor housing.

To avoid the leakage, a gas-tight hermetic seal is required. One prior art solution has been to provide a hermetic, outer metal-glass-inner metal seal. The "inner metal" component of the hermetic seal is typically an electrically conducting post, which is connected to the terminal wire and electrically insulated from the housing by the glass component. The "outer metal" component of the hermetic seal may be an annular band around the glass, which is bonded to the housing. Alternatively, the hermetic seal may be cast in an opening that has been created in the housing, so that the housing itself forms the outer metal component of the hermetic seal.

In the situation of an aluminum case, it has not proven economical, however, to provide a hermetic, aluminum to glass seal, due in part to the significant difference in the thermal coefficient of expansion of the glass or ceramic material used to construct the seal and the thermal coefficient of expansion of aluminum. Consequently, the hermetic seals used in capacitors are generally made with a metal other than aluminum, for example, steels (stainless or other alloys) or tantalum. Although the outer metal portion of the hermetic seal is at approximately the same potential as the electrolyte, in general, if the outer metal is welded to the housing, it should be of the same material as the housing in order to avoid galvanic corrosion, if this region is exposed to the ionically conducting electrolyte.

To avoid galvanic corrosion of the inner-metal portion of the hermetic seal, a liquid-tight seal is typically utilized to prevent exposure of the inner region of the hermetic seal to the electrolyte. Even in the most optimum situation in which all components along the electrically conducting path between the inner-metal portion of the hermetic seal and the anode of the capacitor element consist of the same "valve metal", so that galvanic corrosion is not an issue due to a dissimilar metal junction, a liquid-tight seal is still used to prevent the electrolyte from making contact with the hermetic seal.

A "valve metal" is defined as a metal which grows an electrically insulating oxide in the presence of an electrolyte when a positive potential is applied to the metal with respect to the electrolyte. Examples of such metals are aluminum, tantalum, niobium, tungsten, titanium, zirconium. The two primary reasons that the inner portion of the hermetic seal, including a valve metal seal, should be protected from the electrolyte are the possibilities of intermetallics (impurities) in the valve metal that may not form a proper electrically insulating oxide in the presence of an electrolyte and/or insufficient creepage distance across the glass portion of the seal. Either of these two situations could result in undesirable electrical current flow between the high electrical potential of the inner-metal and the low potential of the outer-metal if the electrolyte is allowed access to all regions of the hermetic seal.

Various capacitor constructions have been disclosed to protect the components of the hermetic seal from corrosion. Sloan, U.S. Pat. No. 3,289,051, discloses a threaded cap containing a hermetic seal, which is screwed on the lid of the capacitor to compress a stack of bushing members. The apparatus of Sloan is complex to manufacture, requiring the assembly of numerous components, many of which must be welded together to maintain the hermeticity of the capacitor. Further, the means to seal the capacitor adds substantial bulk and protrudes from the top of the capacitor.

A paper entitled "Longlife, High-Voltage, Hermetically-Sealed Aluminum Electrolytic Capacitors," presented at CARTS 96: 16th Capacitor and Resistor Symposium, 11-15 Mar. 1996, discloses a hermetic seal. The seal is contained in a multi-component cap welded to the lid of the capacitor. In particular, a metal-glass-metal hermetic seal is welded to a stainless steel tube or cylinder, which is in turn welded to an aluminum cup having a liquid tight seal in the base of the cup. The aluminum cup is welded to the lid of the capacitor. In addition to requiring specialized aluminum to stainless steel welding techniques and multiple welds, the cap is bulky and protrudes from the top of the capacitor.

In U.S. Pat. No. 4,987,519, Hutchins et al. disclose a cylindrical capacitor with a seal created by crimping. An inwardly directed annular bead is formed, which presses an O-ring into a plastic bushing. While the foregoing technique has found utility with cylindrical capacitors, it is not effective for sealing capacitors having other geometric configurations, such as a rectangular prism. Additionally, the capacitor disclosed in U.S. Pat. No. 4,987,519 requires a second seal where the riser wire protrudes from the plastic bushing.

Capacitors having a non-cylindrical casing, especially capacitors having a casing with a flat surface, are particularly difficult to seal. Prior art methods of sealing the liquid typically employ a gasket or seal around the inside perimeter of the casing. As gas pressure builds inside the capacitor, the flat surface may bulge outward, creating a gap between the O-ring or gasket and the casing. Electrolyte can seep through the gap and corrode the terminal in the hermetic seal.

SUMMARY OF THE INVENTION

The object of the present invention is to overcome the aforementioned limitations and shortcomings of the prior art. It may be employed with virtually any capacitor shape, including rectangular prism shapes. The capacitor features a liquid seal that takes up a minimum of space inside the capacitor and does not protrude from the lid of the capacitor. A further advantage of the present invention is that should gas pressure build up inside of the capacitor, the liquid seal will not be compromised due to swelling of the case sides, because the seal integrity does not depend on maintaining the physical dimensions of the capacitor case. Yet another advantage of the invention is that the lid may be used as a "drop in" replacement for prior art lids, without increasing the physical dimensions of the capacitor.

In the present invention, it is possible to provide mechanical isolation between the hermetic seal and the liquid seal. An embodiment of the invention features physical separation of the hermetic seal and the liquid seal, while maintaining a flexible electrical conduit between the dry side of the terminal and the inner portion of the glass seal. This feature allows the liquid seal to flex, without putting mechanical stress on the hermetic seal, and can be a significant advantage. For example, at high internal pressure conditions within the capacitor unit, the terminal is free to move closer to the underside of the lid as it further compresses the elastomer seal, and creates a virtually "leakproof" seal within the full range of pressure levels typically experienced within a capacitor unit.

The capacitor of the present invention is hermetically sealed, which is defined as having a permeability to helium gas of 10-7 cc/second or less, at 25° C. and one atmosphere of differential pressure.

The capacitor is housed in a case, which is a receptacle having an opening at one end. The case is made from a material that is substantially impermeable to gases. By way of example, the case may be made out of metal, in particular, steels (stainless or other alloys), copper, tantalum, aluminum, titanium, niobium, nickel, iron, and zinc. Preferably, the case is made out of steel or steel alloys, including cold-rolled steel, mild steel and stainless steel, tantalum, titanium and niobium. If the case material is susceptible to corrosion, either internally or externally, the material may be coated, plated or provided with other protective treatment, as is known to those skilled in the art.

An advantage of the present invention is that its performance is not dependent upon the case having any particular shape. By way of example, the case may be in the shape of a cylinder, rectangular prism or parallelepiped.

A capacitor element is positioned inside the case. The capacitor element is made up of an anode, a cathode, a dielectric and an electrolyte solution, forming a capacitor capable of supporting a direct current potential, and thereby storing an electrical charge and energy. The anode is a valve metal upon which resides a dielectric, which is generally grown from the base metal in an anodizing electrochemical bath. The anode metal contacts the dielectric on its positively charged side, and the electrolyte contacts the dielectric on its negatively-charged side and conveys the charge to the cathode.

The potentials of the anode and cathode may be conducted to positive and negative terminals, respectively, by means of a tab, wire or other metallic conductor. With respect to the cathode, the capacitor case may be used for the negative terminal.

The anode is prepared from a valve metal. The anode need not be in a specific form, and may, for example be in the form of a plate, foil, pellets or a porous solid. Any of the forms may be treated to enhance their performance, as is known in the art. For examples, foils may be etched to increase their surface area, and pellets may be pressed and sintered to fuse the grains and maintain interstices.

In the case of a polarized, wet electrolytic capacitor, the cathode may be the same or a different metal than the anode or a non-metal, and it is not required that the cathode be capable of forming an oxide. The form of the cathode is selected to be compatible with the anode, to meet the objective of creating a capacitor. This invention can be employed with both polarized and non-polarized wet electrolytic capacitors.

An electrolyte solution is provided in the case, in sufficient quantity to immerse the capacitor element. Generally, the electrolyte solution may be formed of solutes that ionize upon dissolution in a suitable solvent to create an electrically conductive medium. A liquid, electrolyte solution may be added to the capacitor, or the solute and solvent may be added separately to the capacitor, with dissolution occurring in situ. Examples of suitable solutes include organic acids and bases, and inorganic acids and bases. Examples of suitable solvents include water, ethylene glycol, dimethylformamide (DMF), N-methylformamide (NMF), and gamma-butyrolactone (GBL). Particularly useful electrolyte solutions include solutions of sulfuric acid, boric acid and ammonium adipate.

Gas may be evolved during operation of the capacitor, over time. The build up of gas pressure in the capacitor may be reduced by providing a depolarizing agent in the electrolyte solution, such as p-nitrophenol or nitroacetophenone.

The capacitor is sealed by a lid bonded to the open side of the case. The lid is comprised of a plate, bonded to the case to create a hermetic seal, using a suitable technique, including by soldering, welding, such as a tungsten inert gas weld (TIG), plasma weld, or laser weld, or other means to create a metallurgical bond. By way of example, the perimeter of the plate may be bonded to the rim of the case, and may even be inserted in the case so that the plate is flush with the rim of the case. Galvanic corrosion may be minimized by employing the same metal for the case and the plate.

The plate has a hole, extending through the thickness, from the outer side of the plate through the underside of the plate, and provides an opening from the interior to the exterior of the case. The hole is defined by side walls, substantially perpendicular to the plane of the plate. The term "walls" (plural) is intended to include a continuous cylindrical surface, such as is created when a hole is bored in the plate.

The lid further comprises a hermetic seal, covering the side of the hole adjacent the outer side of the plate, and a liquid seal, covering the side of the hole adjacent the underside of the plate. The hermetic seal on one side of the hole, the liquid seal on the other side of the hole and portions of the plate forming side walls of the hole together define a chamber within the plate.

The hermetic seal is an outer metal-glass-inner metal seal. The materials of construction of the hermetic seal are selected to provide compatible coefficients of thermal expansion, imperviousness to gas, and metal to glass adhesion.

The inner metal component is surrounded by the glass, which insulates the inner metal from the outer metal. The inner metal component is electrically conductive and may be made out of the same or different metal as the other metal components of the lid. By way of example, the inner metal component may be a metal post. The metal post may be a solid rod or may be hollow. The metal post may be cylindrical, or it can have flat edges. For example, the metal post may have a square, pentagonal or hexagonal cross-section. In one embodiment, the metal post is a hollow tube. Ordinarily, such a post will be aligned perpendicular to the lid, but the precise angle may be varied, provided that the metal post is not in contact with the outer metal component of the seal and not in contact with the plate or case.

The term "glass" is intended to encompass glass, for example, sodium glass, as well as ceramic materials that are capable of bonding to the outer metal and the inner metal components of the seal, and capable of forming a barrier that is impermeable to gas.

The outer metal component of the hermetic seal comprises an annular band surrounding the glass. Preferably, the outer metal component is formed of a unitary piece of metal. The hermetic seal may be formed by pouring molten glass within the annular band, with the inner metal component aligned in the center of the glass. The outer metal component may be made of the same or different material as the other metal components of the lid. To guard against galvanic corrosion, the outer metal component of the seal is typically constructed out of the same metal as the plate and is at the same electric potential as the plate.

The outer metal component of the hermetic seal is bonded to the plate, to cover the hole in the plate, adjacent the outer side of the plate. The outer metal component may be positioned on top of the hole, partially seated in the hole or fully seated in the hole, for example, the upper surface of the outer metal component may be flush with the plate. In one embodiment of the invention, the hole is counter sunk relative to the outer side of the plate to create a shoulder within the hole, and the hermetic seal is seated on the shoulder.

In addition to the hermetic seal, the lid of the capacitor includes a liquid seal between the electrolyte solution and the hermetic seal, which protects the electrified, inner metal component from corrosion. The liquid seal is affixed to the plate, covering the side of the hole adjacent the underside of the plate. The liquid seal is comprised of a metal terminal and an elastomeric ring, positioned between the terminal and the plate. The terminal is a valve metal. The terminal has a wet side, electrically connected to the capacitor element and a dry side, facing the hermetic seal, that is, the dry side of the terminal faces the chamber formed between the hermetic seal and the liquid seal.

The wet side of the terminal may be connected to the capacitor element by a lead, which, for example, may be round, flat or multifilament wire. The terminal may be connected to either the anode or the cathode of the capacitor element. In one embodiment of the invention, it is desirable that the terminals for both the anode and the cathode be accessible in the lid of the capacitor. For example, in certain "flat" capacitor designs, the anode and cathode are both positioned in the lid of a rectangular prism shaped capacitor. Accordingly, the lid may be provided with two holes, two metal-glass-metal hermetic seals and two liquid seals, that is, one each for the anode and cathode. Additionally, an insulator may be provided on the underside of the terminal for the anode. The insulator is generally a polymer washer such as polypropylene that serves to prevent physical contact between the anode lead of the capacitor element and other metallic components at different electrical potentials.

The dry side of the terminal is electrically connected to the inner metal component of the hermetic seal. The electrical connection may be by a lead, which, for example, may be a round, flat or multifilament wire, or a rod, which is in contact with the inner metal component. In one embodiment, the inner metal component of the hermetic seal is a hollow tube, and the lead is welded to the dry side of the terminal. The lead is inserted through the hollow tube, and the hollow tube may be crimped and welded to create a hermetic seal. Preferably, the lead connecting the dry side of the terminal and the inner metal component of the hermetic seal is flexible.

The lid may be provided with a flange, for affixing the liquid seal to the plate. The flange is positioned adjacent the underside of the plate and projects inward relative to the hole in the plate, creating an orifice that restricts the hole in the plate. The diameter of the hole on the side of the flange facing the hermetic seal (referred to herein as "D1") is greater than the diameter of the orifice. In one embodiment of the invention, the diameter of hole adjacent the outer side of the plate is greater than D1, so that a 2-step counter bore is attained, for seating the hermetic seal.

The flange may be a unitary component of the plate. For example, the flange may project inward from the circumference of the hole. Such a flange can be manufactured by partially boring through the thickness of the plate with a certain diameter bit, followed by boring through the remainder of the plate with a relatively smaller diameter bit. In another embodiment of the invention, the flange may be created by bonding a washer to the underside of the plate, over the hole, such as by welding. The portions of the washer projecting inward, relative to the hole, create a flange, to which the liquid seal may be affixed. The washer size is selected to provide an orifice with a diameter less than the diameter of the hole in the plate, D1.

In one embodiment of the invention, the flange has a thickness of at least 0.1 mm, to achieve the desired support. Preferably, the flange has a thickness of from 0.1 to 1 mm, most preferably from 0.3 to 0.7 mm.

The terminal is electrically insulated from the plate by an elastomeric ring. The elastomeric ring is selected from an elastomer that is resistant to chemical attack by the electrolyte solution and has sufficient dielectric strength to withstand the maximum voltage generated by the capacitor. The elastomeric ring is capable of insulating the lid from the terminal plate. In one embodiment, the elastomer is required to perform over a temperature range of $-55°$ C. to $200°$ C., without degradation or loss of elasticity. Examples of elastomers that may be employed include butyl rubber, chlorobutyl rubber, ethylene propylene rubber (EPR), ethylene propylene diene rubber (EPDM), fluoroelastomers, such as Viton®, polytetrafluoroethylene, such as Teflon®, polychloroprene rubber, such as Neoprene®, butadiene rubber, nitrile rubber, isoprene rubber, silicone rubber and styrene butadiene rubber.

The degree to which the elastomeric ring is compressed to create a liquid seal will vary somewhat, depending upon the elastomer employed. By way of example, the elastomeric ring may be compressed to about 70 to 85% of its original thickness, to create a seal.

In one embodiment of the invention, the elastomeric ring is a grommet covering the inner circumference of the flange, the terminal is positioned inside the elastomeric ring and the terminal is crimped on either side of the flange to compress and hold the elastomeric ring in place, thereby creating a seal.

In another embodiment of the invention, the terminal has a base on one side. The base has a diameter greater than the diameter of the orifice. An elastomeric ring is positioned between the base and the flange. Typically, the elastomeric ring will have a diameter greater than the orifice, but less than the diameter of the base of the terminal. For example, the base of the terminal should overlay the side of the elastomeric ring that it contacts, to ensure uniform compression, without causing the elastomeric ring to be squeezed around the edge of the base. The elastomeric ring is compressed and held in place by a snap ring, which engages a head of the terminal projecting through the orifice on an opposite side from the base. The snap ring should be non-conducting or insulated from the flange, such as with an insulating bushing. Additionally, the shank of the terminal (the portion extending between the base and the head) can be protected from contact with the flange or the inner walls of the orifice by, for example, an electrically insulating material or bushing. The base of the terminal may be positioned on either side of the flange, that is, on the side of the flange facing the hermetic seal (dry side) or on the opposite side of the flange (wet side). It is believed, however, that an arrangement of the base of the terminal on the wet side of the flange provides the best protection against leaks, if internal pressure builds in the capacitor. By way of example, the liquid seal may be structured to create a Bridgman seal.

In one embodiment of the invention, the lid comprises a unitary metal plate, that is, the plate is a single, continuous piece, rather than a composite of multiple pieces bonded together. By way of example, the plate may be manufactured by milling, such as fine milling or using a computer numerically controlled mill (CNC mill), stamping, casting or drawing.

It is desirable that the hole in the plate have a minimum depth, so that there is a space (chamber) between the hermetic seal at one end of the hole and the liquid seal at the other end. The depth required to achieve the spacing may vary depending upon whether the hermetic seal is bonded to the outside of the plate or seated in the hole. Similarly, the positioning of the means to affix the liquid seal, such as providing a flange within the hole or a washer bonded to the underside of the plate, will be a factor in selection of the depth of the hole.

In a one embodiment of the invention, the hole in the plate has a depth of at least 2 mm, to achieve the desired spacing. Preferably, the hole in the plate has a depth of from 2 to 10 mm, most preferably from 3 to 7 mm. It may be understood that the thickness of the plate may vary. For example, the plate may be milled on a CNC mill to remove excess metal, thereby minimizing weight, while leaving sufficient thickness around the walls of the holes to meet the objectives of the invention.

It may be understood that the liquid seal is resistant to failure caused by a gas pressure build-up inside the capacitor. Prior art capacitors having a seal around the inside perimeter of the case tend to fail, if a build-up in pressure causes the case to bulge outward. In addition, if movement of the liquid seal terminal is permitted relative to the glass seal, by means of a flexible electrical connection between them, then the seal integrity actually improves with increased pressure levels as long as the compression strength of the elastomer seal is not surpassed. Preferably, the elastomeric ring does not contact the sides of the case.

The lid may be provided with a separate orifice for introducing the electrolyte solution into the capacitor, after the lid has been bonded to the case. The orifice (or fill hole) is then sealed to create a hermetic seal. For example, the electrolyte may be added through a fill hole, and then the fill hole may be hermetically sealed, such as by welding a cap on the fill hole. In another example, a pop rivet is inserted in the fill hole, after the electrolyte is added and a subsequent welding operation is used to create a hermetic seal.

In addition to the foregoing, the present invention may include one or more of the following features:
  No dissimilar metals are present in the case, plate and outer metal component of the hermetic seal;
  No "exotic" welds of aluminum to ferrous alloys are used;
  The hermetic seal is disk-shaped;
  None of the case, plate or hermetic seal are aluminum; and/or
  The entire lid is flush with the rim of the opening of the case.

BRIEF DESCRIPTION OF THE DRAWINGS

FIG. 1 is a cross-sectional view of the lid of the capacitor.
FIG. 2 is a cross-sectional view of an alternative embodiment of the lid of the capacitor.
FIG. 3 is a cross-sectional view of the capacitor, with the lid of FIG. 1 installed.

DETAILED DESCRIPTION OF THE INVENTION

Without limiting the scope of the invention, the preferred embodiments and features are hereinafter set forth. All of the United States patents, which are cited in the specification, are hereby incorporated by reference. Unless otherwise indicated, conditions are 25° C., 1 atmosphere of pressure and 50% relative humidity.

Referring to FIG. 1, lid 1 comprises metal plate 2, which is shaped to be inserted in and to seal a capacitor case. Plate 2 has an outer side 3, which is part of the outer surface of the capacitor, when it is assembled, and an underside 4, which faces the interior of the capacitor and is exposed to the electrolyte solution. At least one hole 5 extends through the thickness of plate 2. Lid 1 also includes a second hole, designated as hole 5', so that both the anode and the cathode of the capacitor may be connected through lid 1.

Hermetic seal 6 covers hole 5 adjacent the outer side 3 of plate 2, and liquid seal 7 covers hole 5 adjacent the underside 4 of plate 2. Liquid seal 7 has metal terminal 8 and elastomeric ring 9, which insulates terminal 8 from plate 2. In the embodiment of the invention shown in FIG. 1, plate 2 has been provided with flange 10, which forms an orifice 11 in hole 5, adjacent the underside 4 of plate 2. Elastomeric ring 9 may be a grommet, which engages flange 10 when terminal 8 is inserted into orifice 11 and crimped. Electric current from the capacitor element (shown in FIG. 3) is conducted to terminal 8 by lead 12, and is conducted from terminal 8 to hermetic seal 6 by lead 13.

Hermetic seal 6 has a ring of outer metal 14, a disc of insulating glass 15, and a hollow, conducting, inner metal tube 16. Hole 5 is provided with shoulder 17, and hermetic seal 6 is provided with lip 18. When hermetic seal 6 is inserted in hole 5, lip 18 is seated on shoulder 17. The ring of outer metal 14 can be welded to the upper side 3 of plate 2, to create a seal. It may be understood that instead of the outer metal ring of hermetic seal 6 being fully inserted in hole 5, the hermetic seal could overlay the hole and be welded around its outer metal ring to the upper side of the hole in the plate, or the outer metal ring of the hermetic seal could partially protrude from the hole.

FIG. 1 shows hermetic seal 6' inserted in hole 5'. Lead 13' has been threaded through inner metal tube 16', and the end of inner metal tube 16' is crimped and soldered at end 19' to create a seal. Hermetic seal 6' and liquid seal 7' form a chamber 20' defined by walls 21' of hole 5'.

Lid 1 is also provided with fill hole 22, for adding an electrolyte solution to the capacitor, after lid 1 has been installed. Cap 23 is bonded to plate 2, for example by welding, to create a hermetic seal, after the electrolyte solution has been added.

To reduce the overall weight of the capacitor, plate 2 may be provided with recesses 24. For example, excess metal may be removed from plate 2 by milling.

FIG. 2 shows an alternative embodiment of the invention. Lid 31 comprises metal plate 32, which is shaped to be inserted in and to seal a capacitor case. Plate 32 has an outer side 33, which is part of the outer surface of the capacitor, when it is assembled, and an underside 34, which faces the interior of the capacitor and is exposed to the electrolyte solution. At least one hole 35 extends through the thickness of plate 32. Lid 31 may also includes a second hole (not shown), so that both the anode and the cathode of the capacitor may be connected through lid 31. Hermetic seal 36 is essentially the same as in the embodiment of the invention shown in FIG. 1.

Liquid seal 37 engages flange 38, which projects inward from the direction of the circumference of hole 35, adjacent underside 34 of plate 32, to create orifice 39. Flange 38 may be constructed by welding a washer to the underside of the plate, in order to create an orifice having a diameter that is less than a diameter of hole 35. Liquid seal 37 has electrically conductive terminal 40, which has base 41 on the wet side of the capacitor, and head 42, inserted through orifice 39, on the dry side of the capacitor. Elastomeric ring 43 is compressed between base 41 and flange 38, and held in place by snap ring 44, fitted in notches 45 in head 42 of terminal 40. Snap ring 44 rests on bushing 46. The bushing serves several functions, that is, the bushing (i) electrically insulates the terminal from the flange and the plate; (ii) mechanically stabilizes the liquid seal by preventing the terminal from shifting or tilting inside the orifice, as may be caused by vibration or jarring; (iii) establishes and maintains the desired spacing between the head of the terminal and the underside of the flange or plate, which in turn provides the desired compression of the elastomeric ring; and (iv) provides a barrier to contain inward movement of the elastomeric ring under pressure.

Lead 47 and lead 48 are connected to the wet side and the dry side of terminal 40, respectively.

Lid 31 is also provided with fill hole 49, for adding an electrolyte solution to the capacitor, after lid 31 has been installed. Cap 50 is bonded to plate 32, for example by welding, to create a hermetic seal, after the electrolyte solution has been added. Recesses 51 in plate 32 reduce weight.

FIG. 3 shows assembled capacitor 60. Lid 1, shown in FIG. 1, has been bonded to case 61, for example, by welding the perimeter 62 of lid 1 to the perimeter 63 of case 61. Lid 1 is inserted in case 61, so that the outer side 3 of lid 1 is flush with perimeter 63. A capacitor element 64 is positioned in case 61 and immersed in electrolyte solution 65.

Lid 1 has a cathode terminal 66 and an anode terminal 67, connected by leads 12 and 12' to the cathode and the anode of capacitor element 64, respectively. An insulator 68, for example a polypropylene washer, prevents contact between the anode and the casing.

The capacitor may be assembled according to the following steps. The liquid seal is affixed to the lid. The liquid seal engages the flange that forms an orifice in the hole in the plate. The terminal component of the liquid seal is insulated from the plate by an elastomeric ring. The wet side of the terminal is electrically connected to either the anode or the cathode of the capacitor element by a lead, and the dry side of the terminal is connected to another lead. If both the anode and the cathode are to be accessible in the lid, the procedure is repeated for the other terminal.

Next, the hermetic seal is seated in the hole in the plate, while inserting the lead that is connected to the dry side of the terminal though the tube that forms the inner metal component of the hermetic seal. The hermetic seal is bonded to the plate, for example by welding, and the end of the tube (inner metal component of the seal) containing the lead is soldered to create a hermetic seal, and an electrical connection between the tube and the lead.

The capacitor element, which is electrically connected to the lid, is slid into the case, and the case is covered by the lid. The lid and the case are welded around their perimeters to create a hermetic seal.

The capacitor is then immersed in an electrolyte solution and a vacuum is drawn to evacuate the air from the case. The vacuum is released and the electrolyte flows into the capacitor, through the fill hole in the plate, with the application of positive pressure, as necessary, to fully impregnate the capacitor element. Finally, the fill hole is capped and sealed, for example, by welding or soldering.

The invention may be further understood by reference to the following claims.

What is claimed is:

1. A capacitor, comprising:
   (a) a metal case, having an open side;
   (b) a capacitor element positioned inside the case;
   (c) an electrolyte solution contained in the case and in contact with the capacitor element;
   (d) a lid comprising
      i. a unitary metal plate bonded to the open side of the case, the plate having an outer side, an underside, and a hole extending through its thickness from the outer side to the underside;
      ii. a chamber defined by an outer metal-glass-inner metal hermetic seal covering a side of the hole adjacent the outer side of the plate, wherein the outer metal component of the hermetic seal is bonded to the plate, a liquid seal affixed to the plate and covering a side of the hole adjacent the underside of the plate, wherein the liquid seal has a metal terminal, and the terminal is electrically insulated from the plate by an elastomeric ring positioned between the terminal and the plate, and side walls, wherein the side walls of the chamber are portions of the plate defining the hole;
   (e) a first electrical connection between the capacitor element and the terminal; and
   (f) a second electrical connection between the terminal and the inner metal component of the hermetic seal.

2. The capacitor of claim 1, wherein the hermetic seal is seated in the hole in the plate.

3. The capacitor of claim 2, wherein the hole is countersunk relative to the outer side of the plate, to form a shoulder in the hole, and the hermetic seal is seated on the shoulder.

4. The capacitor of claim 1, wherein the plate further comprises a flange projecting inward from a circumference of the hole in the plate, to create an orifice, wherein the flange is a unitary component of the plate, and the terminal is electrically insulated from the plate by an elastomeric ring positioned between the terminal and the flange.

5. The capacitor of claim 4, wherein the elastomeric ring is a grommet positioned in the orifice between the flange and the terminal.

6. The capacitor of claim 4, wherein a portion of the terminal extends through the orifice and the terminal has a base, wherein the base is substantially greater in diameter than a diameter of the orifice and positioned on a side of the flange opposite the hermetic seal, the elastomeric ring is compressed between an underside of the flange and the base, and the terminal is held in place by a snap ring, which is electrically insulated from the lid, and which engages the portion of the terminal protruding upward though the orifice, thereby maintaining compression of the elastomeric ring.

7. The capacitor of claim 1, wherein the lid further comprises an inwardly projecting flange positioned adjacent the underside of the plate to form an orifice restricting the hole in the plate, wherein a diameter of the hole is greater than a diameter of the orifice, and wherein the terminal is electrically insulated from the plate by an elastomeric ring positioned between the terminal and the flange.

8. The capacitor of claim 7, wherein the inwardly projecting flange is a washer, bonded to an underside of the plate, and the elastomeric ring is positioned between a side of the washer opposite the plate and the terminal.

9. The capacitor of claim 1, wherein the hole in the plate has a depth of at least 2 millimeters.

10. The capacitor of claim 1, wherein the hole in the plate has a depth of from 3 to 10 millimeters.

11. A capacitor, comprising:
   (a) a metal case, having an open side;
   (b) a capacitor element positioned inside the case;
   (c) an electrolyte solution contained in the case and in contact with the capacitor element;
   (d) a unitary metal plate bonded to the open side of the case, the plate having a cylindrical hole extending from an outer side of the plate through an underside of the plate, wherein the hole has side walls and a flange, the flange positioned adjacent the underside of the plate and projecting inward from the side walls to create an orifice, and wherein a diameter of the hole adjacent the outer side of the plate is greater than a diameter of the hole at the orifice;
   (e) a disk-shaped outer metal-glass-inner metal hermetic seal covering the hole, adjacent the outer side of the plate, and bonded to the plate at a position above the flange;
   (f) a liquid seal between the electrolyte solution and the hermetic seal, comprising a metal terminal positioned in the orifice in the plate and insulated from the plate by an elastomeric ring positioned between the terminal and the plate;
   (g) a first electrical connection between the capacitor element and the terminal; and
   (h) a second electrical connection between the terminal and the inner metal component of the hermetic seal.

12. The capacitor of claim 11, wherein the hole in the plate has a depth of at least 2 millimeters.

13. The capacitor of claim 12, wherein the hermetic seal is seated in the hole in the plate.

14. The capacitor of claim 12, wherein the hole is countersunk relative to the outer side of the plate, to form a shoulder in the hole, and the hermetic seal is seated on the shoulder.

15. The capacitor of claim 11, wherein the elastomeric ring is a grommet positioned in the orifice, between the flange and the terminal.

16. The capacitor of claim 11, wherein the terminal has a base on its underside, wherein the base is substantially greater in area that the orifice, and the elastomeric ring is compressed between an underside of the plate and the base, and wherein the liquid seal further comprises a snap ring, which is electrically insulated from the lid, and which engages a portion of the terminal protruding upward though the orifice, thereby maintaining compression of the elastomeric ring.

17. The capacitor of claim 11, wherein the hole in the plate has a depth of from 3 to 7 millimeters.

18. The capacitor of claim 17, wherein the elastomeric ring forming the liquid seal does not contact the case.

19. The capacitor of claim 17, wherein the capacitor has the shape of a rectangular prism.

20. The capacitor of claim 11, further comprising:
   (a) a second hole extending from the outer side of the plate through the underside of the plate, wherein the second hole has side walls and a second flange, positioned adjacent the underside of the plate, the second flange projecting inward from the side walls to create a second orifice, wherein the second hole is countersunk relative to the outer side of the plate to form a shoulder in the second hole, and wherein a diameter of the second hole adjacent the outer side of the plate is greater than a diameter of the second hole at the second orifice;
   (b) a second, disk-shaped outer metal-glass-inner metal hermetic seal seated on the shoulder in the second hole, and bonded to the plate at a position above the second flange;
   (c) a second liquid seal between the electrolyte solution and the second hermetic seal, comprising a second metal terminal positioned in the second orifice in the plate and insulated from the plate by a second elastomeric ring positioned between the second terminal and the plate;
   (d) a third electrical connection between the capacitor element and the second terminal; and
   (d) a fourth electrical connection between the second terminal and the inner metal component of the second hermetic seal.

\* \* \* \* \*